(12) United States Patent
Fernandes De Carvalho et al.

(10) Patent No.: US 12,226,042 B2
(45) Date of Patent: Feb. 18, 2025

(54) SINGLE-SERVE PACKAGING, AND MACHINE AND METHOD FOR PREPARING A BREWED BEVERAGE

(71) Applicant: Melitta Single Portions GmbH & Co. KG, Minden (DE)

(72) Inventors: Kerstin Fernandes De Carvalho, Bielefeld (DE); Jan Pahnke, Minden (DE); Holger Feldmann, Willich (DE)

(73) Assignee: Melitta Single Portions GmbH & Co. KG, Minden (DE)

( * ) Notice: Subject to any disclaimer, the term of this patent is extended or adjusted under 35 U.S.C. 154(b) by 887 days.

(21) Appl. No.: 17/420,205

(22) PCT Filed: Jan. 17, 2020

(86) PCT No.: PCT/EP2020/051144
§ 371 (c)(1),
(2) Date: Jul. 1, 2021

(87) PCT Pub. No.: WO2020/152053
PCT Pub. Date: Jul. 30, 2020

(65) Prior Publication Data
US 2022/0061581 A1 Mar. 3, 2022

(30) Foreign Application Priority Data
Jan. 22, 2019 (DE) ..................... 10 2019 101 538.3

(51) Int. Cl.
*A47J 31/36* (2006.01)
*B65D 85/804* (2006.01)

(52) U.S. Cl.
CPC ...... *A47J 31/3623* (2013.01); *B65D 85/8064* (2020.05)

(58) Field of Classification Search
CPC ........................ B65D 85/8046; B65D 85/8061
See application file for complete search history.

(56) References Cited

U.S. PATENT DOCUMENTS 2,291,702 A * 8/1942 Downes ............... B65D 85/812
206/0.5
3,615,708 A * 10/1971 Abile-Gal ............... A47J 31/02
426/77

(Continued)

FOREIGN PATENT DOCUMENTS

DE    602005005835 T2    4/2009
DE    102013200114 A1    7/2014

(Continued)

OTHER PUBLICATIONS

International Search Report dated Jun. 2, 2020 for PCT/EP2020/051144 (with English translation).

(Continued)

*Primary Examiner* — Sean M Michalski
(74) *Attorney, Agent, or Firm* — Collard & Roe, P.C.

(57) ABSTRACT

A single-serve packaging comprising a liquid-permeable filter material that surrounds a chamber in which an extraction material is arranged. The chamber is equipped with a movable closure device which can be moved from a closed position into a position that opens the chamber, wherein at least one marking is provided on the movable closure device in order to identify the single-serve packaging. A machine and a method for preparing a brewed beverage.

5 Claims, 5 Drawing Sheets

(56) References Cited

U.S. PATENT DOCUMENTS

| | | | | |
|---|---|---|---|---|
| 4,560,475 A * | 12/1985 | Kataoka | B65D 85/8061 | D23/209 |
| 4,584,101 A * | 4/1986 | Kataoka | B65D 85/8061 | 210/474 |
| 4,981,588 A * | 1/1991 | Poulallion | A47J 31/02 | 426/77 |
| 5,095,185 A * | 3/1992 | Fuchs, Jr. | A47J 31/547 | 99/305 |
| 5,132,124 A * | 7/1992 | Tamaki | B65D 85/8061 | 426/77 |
| 5,243,164 A * | 9/1993 | Erickson | A47J 31/0642 | 426/243 |
| 5,582,731 A * | 12/1996 | Gianfranco | B65D 85/8061 | 426/77 |
| 5,605,710 A * | 2/1997 | Pridonoff | B65D 85/8061 | 426/77 |
| 5,840,189 A * | 11/1998 | Sylvan | B65D 85/8061 | 99/302 R |
| 7,223,426 B2 * | 5/2007 | Cheng | G06K 19/0712 | 222/137 |
| 7,461,584 B2 | 12/2008 | Blanc et al. | | |
| 7,770,512 B2 * | 8/2010 | Albrecht | A47J 31/4467 | 426/115 |
| 8,051,767 B2 * | 11/2011 | Gerber | A47J 31/0626 | 426/77 |
| 8,409,646 B2 * | 4/2013 | Yoakim | B65D 85/8052 | 99/302 C |
| 8,739,687 B1 * | 6/2014 | Tacklind | A47J 31/42 | 99/290 |
| 8,746,131 B2 * | 6/2014 | Saitoh | A47J 31/005 | 99/321 |
| 8,770,094 B2 * | 7/2014 | Rithener | A47J 31/00 | 99/279 |
| 9,282,847 B2 * | 3/2016 | Akpata | B01D 29/016 | |
| 10,039,408 B2 * | 8/2018 | Chang | B65D 85/812 | |
| 10,076,208 B2 | 9/2018 | Castellani et al. | | |
| 10,271,678 B1 * | 4/2019 | Lin | A47J 31/446 | |
| 10,336,531 B2 * | 7/2019 | Trombetta | B65D 85/8046 | |
| 10,405,691 B2 | 9/2019 | Hesselbrock et al. | | |
| 10,869,573 B2 * | 12/2020 | Jagne | A47J 31/52 | |
| 11,548,721 B2 * | 1/2023 | Fernandes de Carvalho | B65D 85/8061 | |
| 2004/0226452 A1 * | 11/2004 | Lyall, III | A47J 31/106 | 99/279 |
| 2008/0081089 A1 | 3/2008 | Blanc | | |
| 2008/0121110 A1 * | 5/2008 | Lee | A47J 31/103 | 99/288 |
| 2009/0136639 A1 * | 5/2009 | Doglioni Majer | A47J 31/5255 | 99/302 R |
| 2010/0089245 A1 * | 4/2010 | Gerber | A47J 31/02 | 141/297 |
| 2010/0166928 A1 * | 7/2010 | Stamm | A47J 31/002 | 426/435 |
| 2010/0288133 A1 * | 11/2010 | Litzka | A47J 31/08 | 99/299 |
| 2011/0283891 A1 * | 11/2011 | Mariller | B65D 85/8046 | 206/0.5 |
| 2012/0231135 A1 * | 9/2012 | Cabe | A47J 31/0647 | 426/433 |
| 2013/0129876 A1 * | 5/2013 | Ye | A47J 31/3638 | 426/232 |
| 2014/0013958 A1 * | 1/2014 | Krasne | A47J 31/057 | 99/284 |
| 2014/0208952 A1 * | 7/2014 | Starr | A47J 31/462 | 99/302 R |
| 2014/0208954 A1 * | 7/2014 | Starr | A47J 31/0576 | 99/283 |
| 2014/0287099 A1 * | 9/2014 | Trombetta | B65D 85/8061 | 426/115 |
| 2014/0287104 A1 * | 9/2014 | Austin | B65D 85/8046 | 426/115 |
| 2014/0314912 A1 * | 10/2014 | Stewart | A23F 3/14 | 53/235 |
| 2014/0345473 A1 * | 11/2014 | Albritton | A47J 31/08 | 99/323 |
| 2015/0305544 A1 * | 10/2015 | Lancey | A47J 31/0621 | 426/431 |
| 2015/0347887 A1 * | 12/2015 | Vosoogh-Grayli | G06K 19/06084 | 235/494 |
| 2018/0354713 A1 * | 12/2018 | Ting | B65D 85/8058 | |
| 2018/0357597 A1 * | 12/2018 | Magatti | A47J 31/3623 | |
| 2019/0119037 A1 | 4/2019 | Trombetta | | |
| 2021/0061547 A1 * | 3/2021 | Fernandes de Carvalho | B65D 85/8043 | |
| 2022/0024685 A1 * | 1/2022 | Fernandes de Carvalho | B65D 85/8061 | |

FOREIGN PATENT DOCUMENTS

| | | |
|---|---|---|
| DE | 102014109768 A1 | 1/2016 |
| DE | 102018101338 A1 | 7/2019 |
| EP | 1786303 A1 | 5/2007 |
| JP | 2013517027 A | 5/2013 |
| WO | 2006032565 A1 | 3/2006 |
| WO | 2011089048 A1 | 7/2011 |
| WO | 2013046149 A1 | 4/2013 |
| WO | 2013080073 A1 | 6/2013 |
| WO | 2014153659 A1 | 10/2014 |
| WO | 2017093015 A1 | 6/2017 |

OTHER PUBLICATIONS

German Search Report dated Sep. 6, 2019 issued in corresponding German Application Serial No. 10 2019 101 538.3 (with English translation of relevant parts).

* cited by examiner

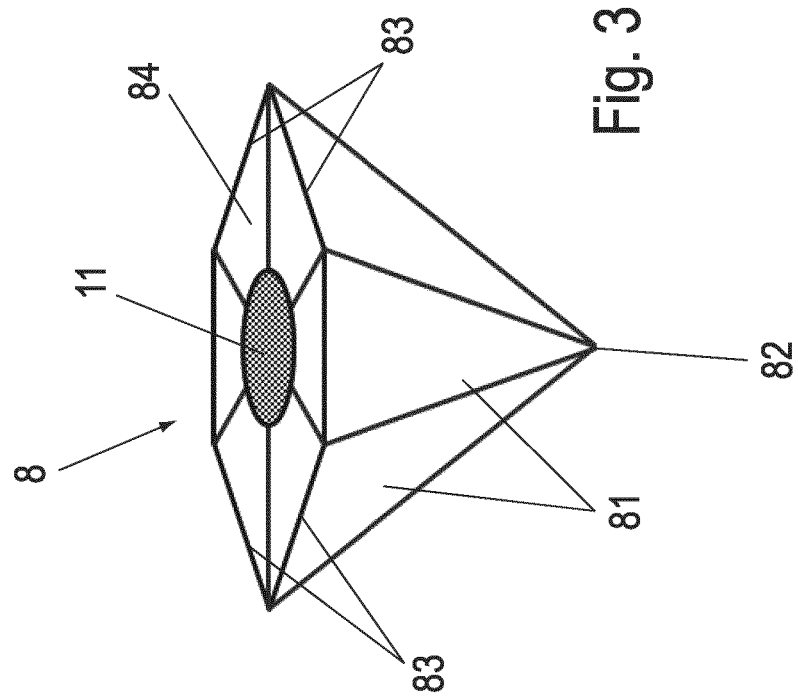
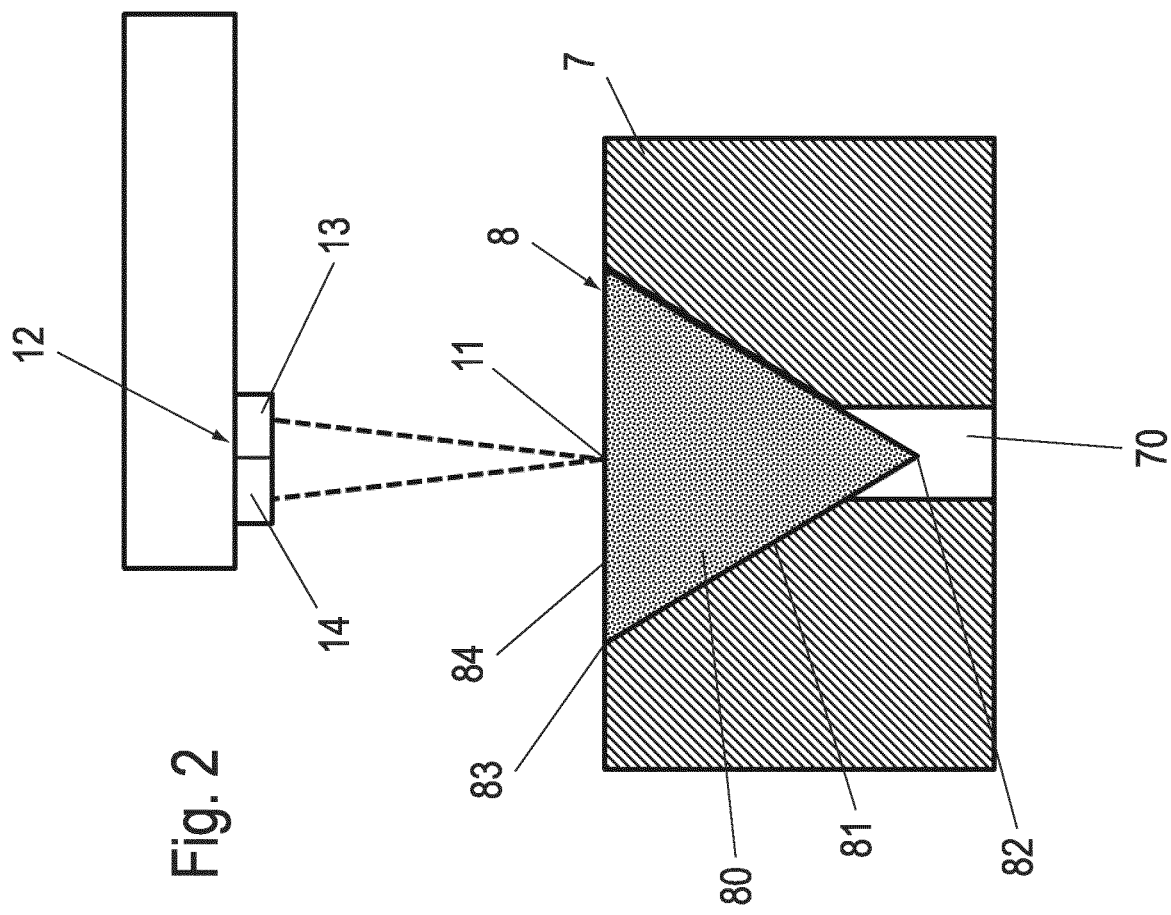

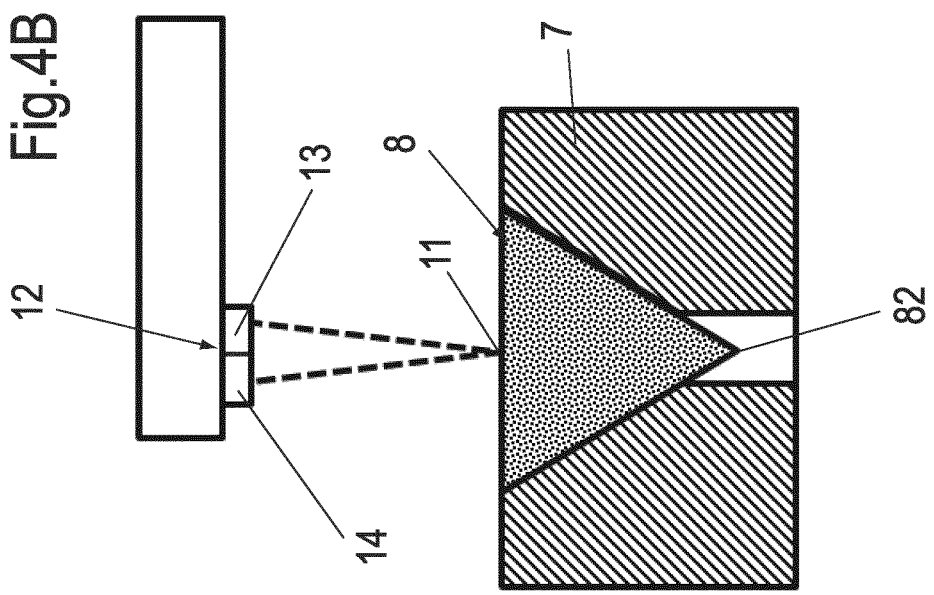
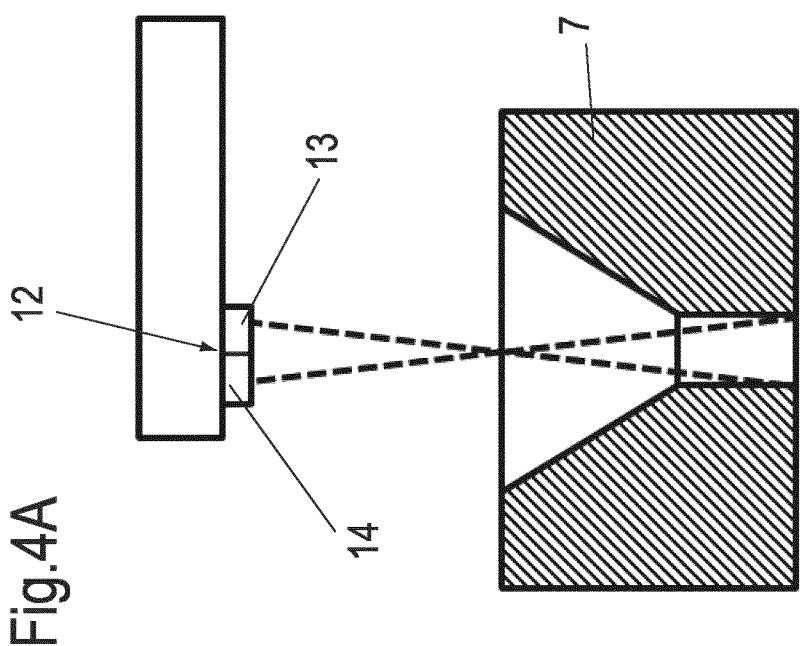

SINGLE-SERVE PACKAGING, AND MACHINE AND METHOD FOR PREPARING A BREWED BEVERAGE

CROSS REFERENCE TO RELATED APPLICATIONS

This application is the National Stage of PCT/EP2020/051144 filed on Jan. 17, 2020, which claims priority under 35 U.S.C. § 119 of German Application No. 10 2019 101 538.3 filed on Jan. 22, 2019, the disclosures of which are incorporated by reference. The international application under PCT article 21(2) was not published in English.

BACKGROUND OF THE INVENTION

The present invention relates to a single-serve packaging, comprising a liquid-permeable filter material surrounding a chamber in which an extraction material is disposed, wherein a movable closure device is provided on the chamber and is movable from a closed position to a position opening the chamber, a machine for preparing a brewed beverage having a device for generating hot water, a holder for a single-serve packaging containing an extraction material for arranging the single-serve packaging under a feed for the hot water, and a controller and detection unit, and a method for preparing a brewed beverage.

DE 10 2014 109 768 A1 discloses a device for preparing brewed beverages in which a light guide is provided on a base of a capsule in order to be able to identify the capsule by introducing and deflecting light. Such identification of the capsule enables optimized program control of the device. However, it is not possible to identify whether a capsule is in an open or closed position.

In EP 1 786 303 B1, an identification mark on a capsule is detected via a detection device, wherein the detection device is provided on the slide rail for feeding the capsule. Again, although the capsule can be identified, it is not possible to detect different states of the capsule.

WO 2013/080073 discloses a single-serve packaging having a liquid-permeable material and a perforated foil that can be used for detection. The single-serve packaging with the extraction material remains in a closed state even after removal of the foil and is not opened.

SUMMARY OF THE INVENTION

Therefore, it is an object of the present invention to provide a single-serve packaging, a machine and a method for preparing a brewed beverage having an improved recognition of a single-serve packaging to simplify handling.

In the single-serve packaging according to the invention, an extraction material is arranged in a chamber which is surrounded by a liquid-permeable filter material, wherein a movable closure device is provided for opening the chamber, which closure device can be moved from a closed position to an open position, wherein at least one marking for identifying the single-serve packaging is provided on the movable closure device. Thus, on the one hand, an identification of the single-serve packaging can take place via a detection unit, for example in order to control preparation parameters during brewing of the beverage, such as the temperature of the hot water or the amount of hot water, and, on the other hand, it can be detected via the detection unit whether the single-serve packaging is in a closed or in an open position, since the marking is arranged on the movable closure device. By moving the closure device, the marking also moves, and thus an open position of the single-serve packaging can also be detected.

Preferably, the closure device has at least one pivotable flap. The flap may be arranged on an upper side of the single-serve packaging when the single-serve packaging is in a use position, i.e. inserted into a holder of a machine for preparing a brewed beverage. Preferably, the closure device comprises a plurality of pivotable flaps which are, for example, triangular in shape and circumferentially surround an upper opening in the open position. Depending on the design of the single-serve packaging, between two and ten pivotable flaps may be provided at the top, preferably between four and eight flaps, in particular six flaps.

In a further design, the marking is provided at the end of each flap, wherein in the closed position of the single-serve packaging the markings on the individual flaps form a common surface, for example a colored surface or other coding, such as a bar code or a symbol. At least some of the pivotable flaps can have a marking at the end so that it can be detected whether these flaps are in an open or closed position.

Preferably, the single-serve packaging comprises a support body made of cardboard, which is connected to the filter material, wherein the support body has a folding edge on which the flaps of the closure device are pivotably mounted. By moistening the folding edge, the closure device with the flaps can then be moved from a closed position to the open position, since the moistening initiates swelling processes that cause the flaps to pivot at the folding edge. The single-serve packaging can be designed, for example, as disclosed in DE 10 2018 101 338.

In the machine for preparing a brewed beverage according to the invention, a marking arranged on a movable closure device of the single-serve packaging can be detected in the closed position via a detection unit, so that on the one hand the single-serve packaging can be identified and on the other hand the closed and opened state of the single-serve packaging can also be detected. The detection unit is preferably located above the single-serve packaging adjacent to an inlet for hot water. The detection unit can be, for example, an optical detection unit comprising a light source and an optical reader. The light source may be an LED that illuminates a closure device of the single-serve packaging, with the reflection being detected via the optical reader, for example via a camera. The marking can be designed as a color marking, for example, so that color recognition can be performed via an RGB sensor to detect different types of single-serve packages.

In the method according to the invention, after a single-serve packaging has been placed in a holder of a machine, a detection of a marking on a closure device on an upper side of the single-serve packaging is performed by a reader of the machine before the brewing process is then initiated. Preferably, after a single-serve packaging has been detected in the holder of the machine, a small amount of hot water is applied to the single-serve packaging by a controller to open it, and after a predetermined waiting time, for example between 2 s and 30 s, in particular 4 s to 15 s, hot water is again applied to the then opened single-serve packaging to brew the beverage. This two-stage process can be monitored by the controller by first detecting the closed position of the single-serve packaging and then checking, after the single-serve packaging has been opened, whether the closure device is actually still not in the closed position. This can prevent the dispensing of hot water if there is a malfunction, reducing the risk of injury to the user. The detection unit can be used to check whether the single-serve packaging has also been opened by the first dispensing of hot water. At the same time, the total preparation time can also be optimized, as there does not necessarily have to be a fixed waiting time between the first and further addition of water, but it can be detected at which point the single-serve packaging is open enough to continue in the process.

Furthermore, the controller can optionally be used to block a dispensing of hot water if no single-serve packaging has been detected in the holder of the machine by the detection unit or if a single-serve packaging has already been used. This further reduces the risk of injury to the user, as no insertion of the single-serve packaging can occur in the process that has already started.

The invention is explained in more detail below by means of an exemplary embodiment with reference to the accompanying drawings, wherein:

BRIEF DESCRIPTION OF THE DRAWING FIGURES

FIG. 2 shows a schematic view of a single-serve packaging used in the machine during detection;

FIG. 3 shows a perspective view of a single-serve packaging;

FIGS. 4A to 4D show several schematic views of the detection unit at different stages of the production of a brewed beverage.

DETAILED DESCRIPTION OF THE INVENTION

Figure 1:
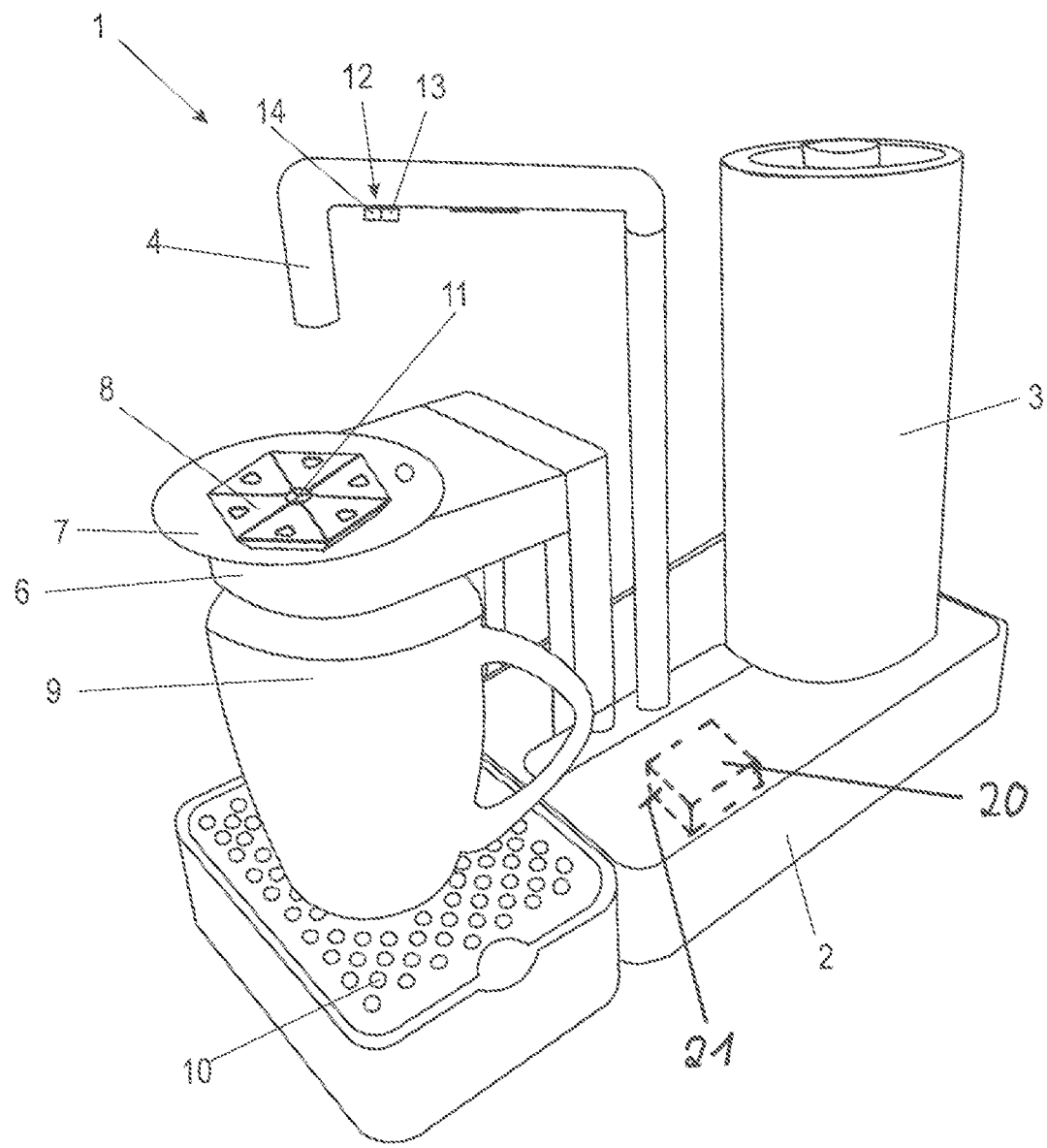
FIG. 1 shows a schematic perspective view of a machine for preparing a brewed beverage.

A machine 1 comprises a housing 2, on which a preferably removable fresh water tank 3 is provided, from which water can be conveyed via a pump and a heating device in order to dispense hot water at a feed 4. The machine 1 has a stationary holding device 6 on the housing 2, into which a holder 7 is inserted, which has a receptacle for a single-serve packaging 8. The single-serve packaging 8 is located below the feed 4 and has a marking 11 on the upper side, which can be detected by a detection unit 12. For this purpose, the detection unit 12 has a light source 13, for example an LED, via which light is emitted onto the upper side of the single-serve packaging 8. Adjacent to the light source 13, an optical reader 14 is provided, for example with an RGB sensor, to detect the light reflected from the marking 11. A colored surface of the marking 11 can thus be detected by the sensor and used for type identification. The colored surface may be applied, for example, by printing or an adhered label.

During the brewing process, hot water is then applied to the opened single-serve packaging 8 via the feed 4. The water flows through the single-serve packaging 8 and is introduced below the holder 7 into a cup 9, which is placed on a drip tray 10 of the machine 1.

FIG. 2 schematically shows the detection unit 12, which has a light source 13 and an optical reader 14. The detection unit 12 is arranged above the single-serve packaging 8, which is accommodated in the holder 7. The single-serve packaging 8 comprises a liquid-permeable filter material, for example a paper or a non-woven fabric, having side walls 81 which taper obliquely and terminate at a tip 82 in the lower region. A folding edge 83 is provided on the upper side of the side walls 81, on which a closure device 84 is pivotably mounted. The marking 11 is thereby located on the closure device 84, which is shown in FIG. 2 in a closed position. An extraction material, such as coffee or tea, is arranged in a chamber 80 within the single-serve packaging 8.

Furthermore, it can be seen that the lower tip 82 of the single-serve packaging 8 is located above a drainage channel 70 in the holder 7.

The light source 13 emits light onto the marking 11 on the upper side of the single-serve packaging 8, as shown by the dashed lines. The reader 14 detects the light beams reflected from the marking 11, so that it is possible to detect which type of single-serve packaging 8 is arranged in the holder 7 by color design of the marking 11 on the optical reader 14. In order to minimize ambient light influences, a combination measurement, i.e. a measurement without illumination by the light source 13 and a measurement with illumination by the light source 13 and a subsequent signal evaluation, can also be performed.

FIG. 3 shows a single-serve packaging 8. The single-serve packaging 8 is pyramidal in shape and includes a lower top 82 from which side walls 81 extend upwardly in an expanding manner. A folding edge 83 is provided on the upper side of each side wall 81, connecting the side walls 81 to an upper closure device 84 having a plurality of pivotable flaps which are oriented substantially horizontally in the closed position. The horizontal orientation here refers to the position inserted into the holder 7 during beverage preparation. The closure device 84 with the pivotable flaps comprises the marking 11 at the end, which may optionally be provided on a single flap, but preferably is composed of a plurality of surfaces of individual flaps. For example, three flaps may have a colored marking at the end which together form the continuous marking 11 in the closed position.

The single-serve packaging 8 may be formed substantially as described in the application DE 10 2018 101 338. In particular, the single-serve packaging 8 may comprise a liquid-permeable filter material held in an annular support body. The support body may thereby form the folding edges 83 and be made of cardboard or another swellable material. By applying a small amount of hot water to the upper side of the single-serve packaging 8, the water reaches the folding edges 83 and causes swelling processes there which ensure that the closure device is opened by causing the individual flaps to swing open upwards. A mechanical interlock of the flaps can thus be opened, as described in the mentioned application.

The control of the machine 1 for preparing a brewed beverage is explained in the different steps in FIGS. 4A to 4D:

In FIG. 4A, no single-serve packaging 8 is inserted into the holder 7, and the detection unit 12 can detect this because no reflection of the light beams emitted by the light source 13 is detected by the optical reader 14. A discharge of hot water can thus be blocked to minimize the risk of injury to the user. In addition, information can be output on a display of the machine 1 that no single-serve packaging 8 is arranged in the holder 7.

In FIG. 4B, a single-serve packaging 8 has been inserted into the holder 7. The detection unit 12 detects the marking 11 on the upper side of the single-serve packaging 8 by reflecting the light beam emitted by the light source 13 through the marking 11 and detecting it by the optical reader 14. This detection can signal to the controller 20 via inputs 21 (see FIG. 1) that a closed single-serve packaging 8 is located in the holder 7 and that the brewing operation can be initiated.

Figure 4C:
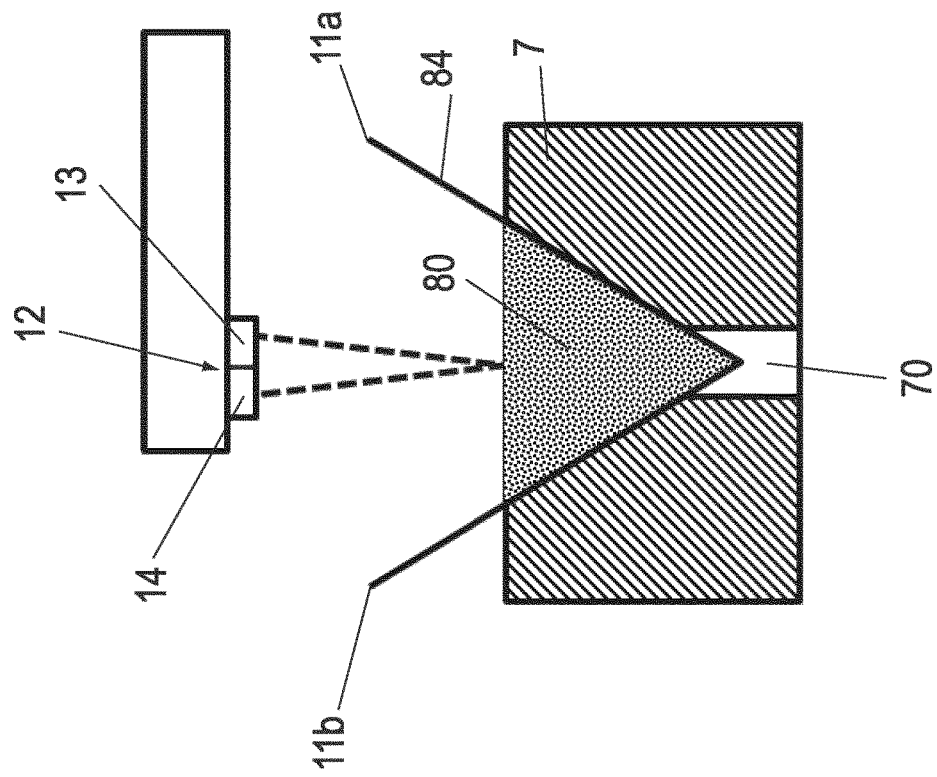

In a first step, a small amount of hot water is now applied to the top of the single-serve packaging 8 to open the closure device 84 of the single-serve packaging 8, as shown in FIG. 4C. The application of hot water to the single-serve packaging 8 opens the closure device 84 with the individual circumferentially arranged flaps, wherein the flaps expose an upper side of the chamber 80 for the brewing process. After a predetermined waiting time, for example between 2 s and 20 s, the detection unit 12 can detect whether the closure device 84 is at least partially in the open position. In FIG. 4C it can be seen that a first section 11a of the marking 11 and a second section 11b of the marking 11 are provided on different flaps of the closure device 84, and by moving the marking 11 the detection unit 12 can now detect an at least partially open position of the single-serve packaging 8.

Figure 4D:
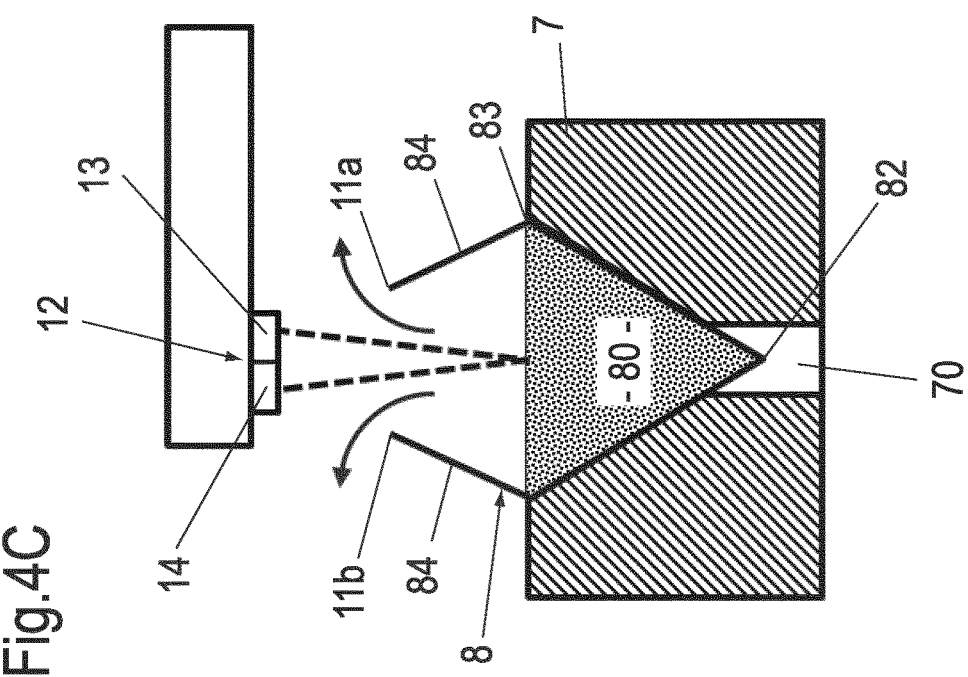

FIG. 4D schematically shows the fully open position of the single-serve packaging 8, in which the entire surface of the chamber 80 is accessible above the extraction material so that hot water can be applied from above. Detection of the open position of the closure device 84 can be carried out, for example, in that an extraction material, for example brown coffee grounds, is arranged in the chamber 80, so that the color brown can be detected by the optical reader. The marking 11 may be provided in colors other than the extraction material, such as red, green, or blue, so that the color detection can be used to detect both whether no single-serve packaging is inserted into the holder 7, i.e., no reflection occurs, or whether a single-serve packaging 8 is inserted in the closed position, or when the brown coffee grounds are detected, the single-serve packaging 8 is arranged in an open position.

Figure 5:
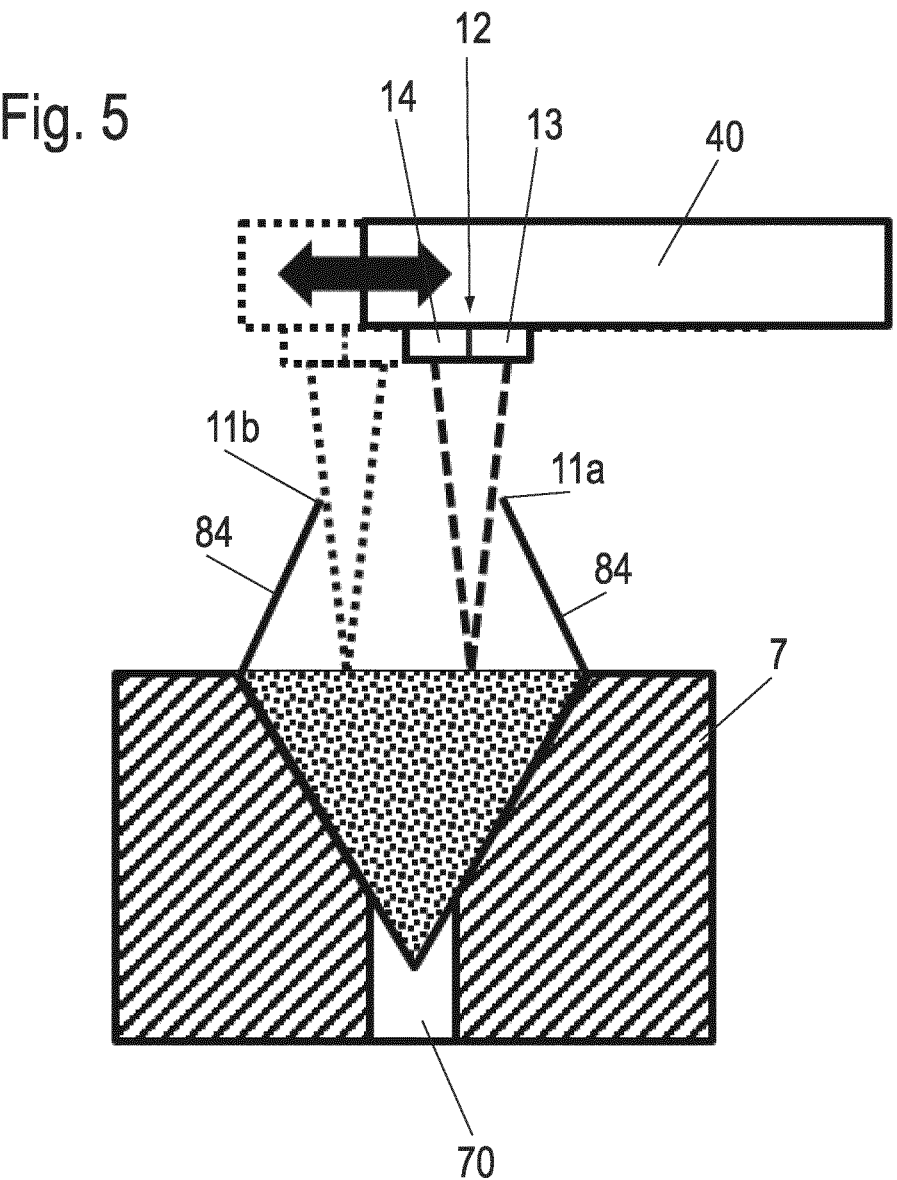
FIG. 5 shows a schematic view of a movable detection unit that enables dynamic measurement.

In a particularly advantageous design of the machine, the detection unit is arranged in a movable part 40, for example a movable feed, so that it does not interfere with the insertion and removal of the single-serve packaging, but is in the correct relative position (e.g. perpendicularly above it) to the single-serve packaging 8 during measurement. The movable part 40 can be moved by a drive and controller of the machine. A movable detection unit further enables dynamic measurement of the opening angle. This is shown in FIG. 5. In contrast to the static measurement, with which a certain minimum opening can be determined, any opening angle between 0° and 90° can be determined in this way.

In the exemplary embodiment shown, the single-serve packaging 8 contains coffee grounds. It is also possible to provide tea or another extraction material instead of coffee grounds. In addition, the single-serve packaging 8 can be used to prepare soups or other food products.

LIST OF REFERENCE NUMERALS

1 Machine
2 Housing
3 Fresh water tank
4 Feed
6 Holding device
7 Holder
8 Single-serve packaging
9 Cup
10 Drip tray
11 Marking
11a Section
11b Section
12 Detection unit
13 Light source
14 Reader
70 Drainage channel
80 Chamber
81 Side wall
82 Tip
83 Folding edge
84 Closure device

What is claimed is:

1. A method for preparing a brewed beverage, comprising the following steps:
   inserting a single-serve product formed by a single-service packaging (8) comprising a liquid-permeable filter material containing an extraction material in the form of an extractable food or beverage product into a holder (7) of a machine (1);
   detecting a marking (11) on a closure device (84) on an upper side of the single-serve packaging (8) by a detection unit (11) of the machine (1), wherein the closure device (84) comprises a plurality of pivotable flaps which in the open position circumferentially surround an opening to the chamber (80);
   opening the closure device (84) and moving the marking (11) of the single-serve packaging (8) via an action of the machine in response to the detection unit detecting the marking (11) indicating a closed single-serve packaging (8);
   supplying hot water to the opening at the top of the single-serve packaging (8) and brewing a beverage, and collecting the brewed beverage under the single-serve packaging (8).

2. The method according to claim 1, wherein, wherein the step of opening takes place by the machine applying hot water to the single-serve packaging (8) in order to open it, by causing swelling of the closure device, which causes individual flaps of the packaging to swing open, and after a waiting time, and after detection of a successful opening of the single-serve packaging (8), hot water is again applied to the opened single-serve packaging (8) in order to brew the beverage.

3. The method according to claim 2, wherein the detection unit (12) checks whether the single-serve packaging (8) has been opened after the first application of hot water.

4. The method according to claim 1, wherein a dispensing of hot water is blocked no single-serve packaging (8) is detected in the holder (7).

5. The method according to claim 1, wherein a dispensing of hot water is blocked if an already opened single-serve packaging (8), is detected in the holder (7).

* * * * *